Oct. 27, 1970

H. JENSEN ET AL  3,536,992

METHOD FOR CONDUCTING GEOPHYSICAL SURVEYS UTILIZING
INFRARED SCANNING SIMULTANEOUSLY WITH THE
RECORDING OF GEOPHYSICAL VARIABLES

Filed Nov. 20, 1968

INVENTORS
HOMER JENSEN
GERARD L. DIETRICH

By Walter R. Thiel
Attorney

United States Patent Office 3,536,992
Patented Oct. 27, 1970

3,536,992
METHOD FOR CONDUCTING GEOPHYSICAL SURVEYS UTILIZING INFRARED SCANNING SIMULTANEOUSLY WITH THE RECORDING OF GEOPHYSICAL VARIABLES
Homer Jensen, Philadelphia, and Gerard L. Dietrich, Cheltenham, Pa., assignors to Aero Service Corporation, Philadelphia, Pa., a corporation of Delaware
Filed Nov. 20, 1968, Ser. No. 777,345
Int. Cl. G01v 3/16
U.S. Cl. 324—4
4 Claims

ABSTRACT OF THE DISCLOSURE

This is a method for correlating ground position of an aircraft conducting a geophysical survey by means of image correlation although the survey is conducted during periods of low light intensity. In this method, sensors conveyed by the aircraft measure the magnetic field or the gradient of the magnetic field by known methods, and imposed upon the recording of such measurements at periods throughout the survey is a fiducial mark for purposes of correlation of said recording. Instead of the normal photographic correlation methods, an infrared scanning device is utilized which produces a pictorial record of the ground which may be correlated with the magnetic record by means of corresponding fiducial marks.

FIELD OF THE INVENTION

This invention relates to an improved method for conducting airborne geophysical surveys during periods of low light intensity and, more particularly, a method for obtaining a representation of the ground over which the survey is conducted and for correlating this representation with the record of the detected geophysical variables.

DESCRIPTION OF THE PRIOR ART

The making of geophysical surveys from the air requires the flying of a set of profiles over the area to be surveyed and measuring the geophysical variables during the flight. Efficiency demands that the lines or headings traversed by the aircraft be equally spaced, but the heart of the problem of interpreting the geophysical variables is not in the spacing of the lines, but in the exact recapture of the path flown and the correlation of moments of time on this path with the simultaneous events on the record of the geophysical variables.

One method of establishing correlation is through the use of photographs of the geography traversed by the aircraft at intervals, using conventional photographic techniques. Typically, the camera would be triggered by an intervalometer causing photographs to be made at approximately equal time intervals. These photographs may be compared with aerial maps or aerial mosiacs so that the center points for each individual photograph can be located. The path flown by the aircraft is determined by connecting the center points of adjacent photographs. Marks are made on the records of the geophysical variables at times corresponding to each of the photographs so that correlation between the two records can be made along the path. This method is more fully described in U.S. Pat. No. 2,598,697.

In another method, a strip camera is utilized instead of the standard camera of the above-described method. In this method the photographic film moves past a slit at the same speed as the image moves, as a consequence of the aircraft's forward motion. The resulting picture shows a continuous path without frame marks and the center line of the photograph is the plumb projection of the aircraft's path. At intervals along the path marks are made upon the strip film by the flashing of a light or the opening of a shutter, or by a similar method, simultaneously with the making of correlation marks on the associated records of the geophysical variables. In addition, a sequential number counter is photographed and is recorded on the related data so that in the data compilation the sequence of numbers establishes the sequence of correlated points in relation to geographic position. For a more complete description of this method, reference may be made to U.S. Pat. 2,598,698.

As the need increases for more accurate and precise information concerning the location of mineral and petroleum deposits, new methods and devices have been devised for locating such geophysical quantities. For many years such surveys were conducted by conveying over the terrain a single device, such as a magnetometer, capable of detecting the magnetic field present or other geophysical variable. From the interpretation of the record of the detected variable, locations of specific deposits of geophysical quantities could be determined. However, such methods, while satisfactory for some explorations, did not develop information precise enough for others. Therefore, it was found that by conveying simultaneously over the terrain two vertically separated magnetometers and registering the difference between the magnetic field sensed by each magnetometer, a far greater sensitivity could be established. The system using simultaneous magnetometers to establish a gradient is called a gradiometer.

It has been found that to develop the sensitivity of a gradiometer, the survey must be flown during conditions of relatively stable air. Since considerable survey work is being performed over desert areas having turbulence-causing, daytime "thermals," or mountainous terrain having erratic air currents and winds, such surveys are generally flown when there is sufficient light to operate the photographic equipment, but prior to the generation of such turbulence-causing factors. Such times are typically at dawn and dusk. However, since these are rather short time periods, it has been desirable to find a method for conducting such surveys throughout the night, and it is such a method that forms this invention.

Therefore, an object of this invention is to provide an improved method for conducting airborne geophysical surveys during periods of low light intensity.

Another object of this invention is to provide an improved method for conducting geophysical surveys at night wherein a recording of the geography traversed by the aircraft may be correlated with the corresponding recording of the sensed geophysical variables.

SUMMARY OF THE INVENTION

Briefly stated, and in accordance with one embodiment of the present invention, the improved method of conducting an airborne geophysical survey during periods of low light intensity comprises the recording of the path traversed by the aircraft through the use of an infrared scanning device simultaneously with the recording of geophysical variables, such as through the use of a magnetometer or gradiometer and conventional analog and digital recording systems. One feature of the invention is that the forward speed of the scanning device is controlled by a signal derived from the fundamental frequency generated by a conventional doppler navigation system used to guide the aircraft. In this manner, the film in the scanning device moves at such a rate that it has a constant longitudinal scale in relation to the ground position.

BRIEF DESCRIPTION OF THE DRAWINGS

The attached drawings and their description show specific details of one embodiment of the invention. Other objects and advantages of the invention are apparent from these drawings and their description.

Referring now to FIG. 1, there is shown an aircraft 10, such as a DC-3, conveying a pair of aerodynamic vehicles or birds 12, 14, each containing a magnetometer or other detector for sensing geophysical variables (not shown). One of the birds 12 is designed to have a high drag so that it will fly substantially behind the aircraft; and the other is designed to have low drag in conjunction with augmented weight, so that it flies well beneath the aircraft, thus producing a vertical separation between the two magnetometers. This establishes a gradiometer system. Associated with a cable 16 suspending each bird are electrical conductors connecting the magnetometer carried by the bird to the electrical apparatus in the aircraft for measuring and recording the magnetic field sensed by the magnetometer. Also conveyed by the aircraft, but positioned therein for laterally scanning the ground traversed by the aircraft through an opening in the fuselage, is a device 18 for detecting energy in the infrared portion of the light spectrum. Such a device may be a conventional infrared scanner. The infrared scanner produces a photograph-like representation of the ground simultaneously with the recording of the geophysical variables.

Figure 1:
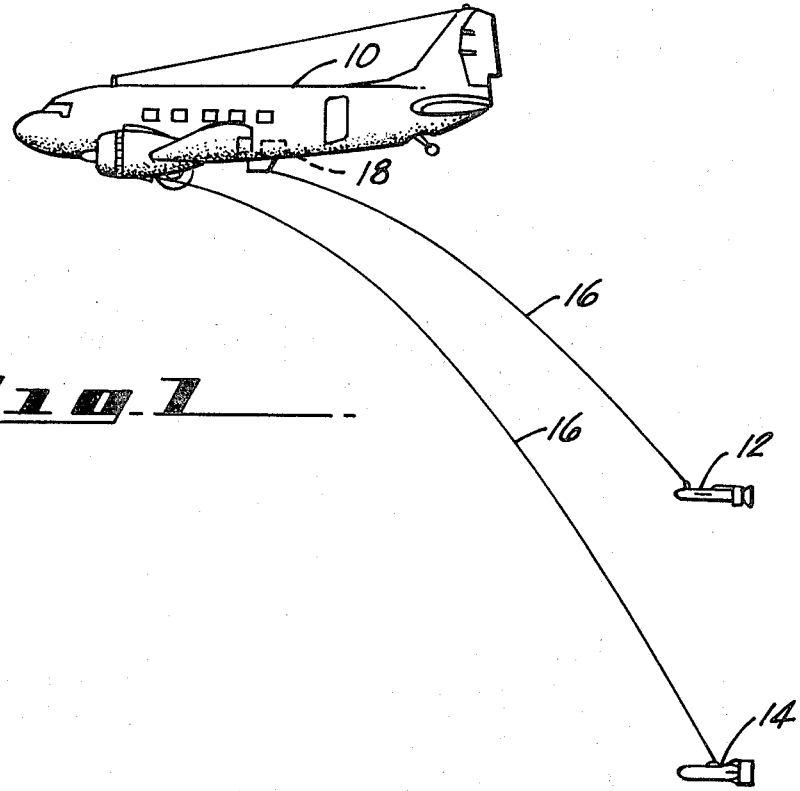
FIG. 1 illustrates a typical application of one embodiment of the present improved method of geophysical survey and shows an aircraft conveying a gradiometer.

While in FIG. 1 one embodiment of a typical application of the present invention is illustrated as including a gradiometer system, it should be understood that the principles of this invention are applicable to a system employing a single magnetometer, or other geophysical variable detection devices or systems such as a scintillometer.

Figure 2:
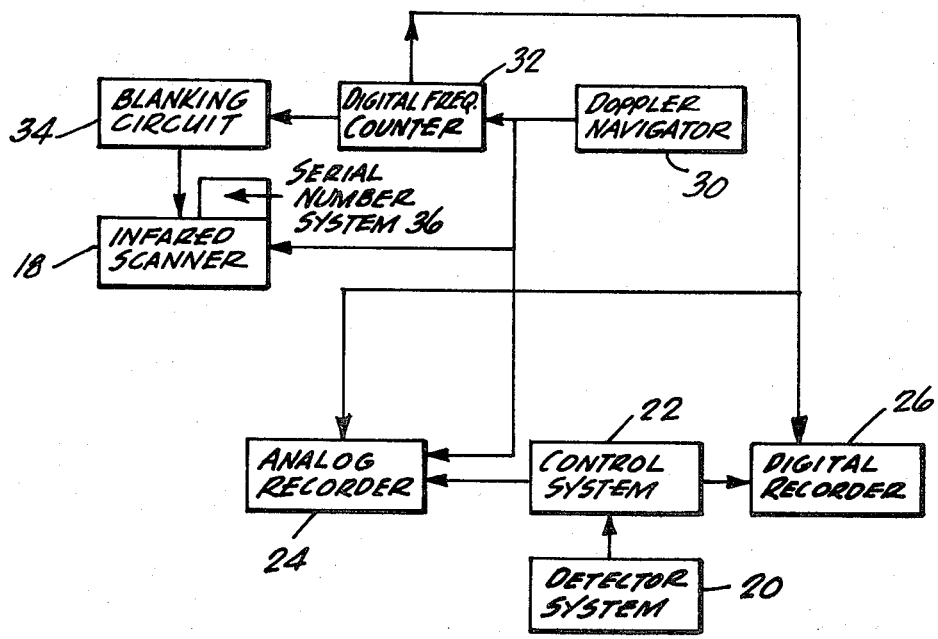
FIG. 2 is a block diagram of the principal components of the system which function to produce the improved method of geophysical survey of the present invention.

As shown in block form in FIG. 2, the electrical signal developed by the detector system 20 is coupled to a control system 22 and simultaneously to both an analog recorder 24 and a digital recorder 26. Typically, the control system 22 is conventional in nature and functions to perform various electrical control operations necessary for the developed signal to be received by each of the recorders. The digital recorder may be of a magnetic tape type and develops a digital record representative of the detected magnetic field or other geophysical variable. The analog recorder is of conventional construction and develops a visual record of the geophysical variable by the writing of a pen on a continuously moving record called the data acquisition train of the analog recorder.

Since the ground speed of the aircraft is a variable, as a consequence of the winds encountered, the recording of data would be at different scales if the data acquisition train of the analog recorder 24 were driven at a constant rate of speed. To avoid this variability of scale, the frequency derived from a doppler navigation system 30 of the aircraft is used to control the driving of the data acquisition train, i.e., it is used to control the speed of the advancing motor of the media on which the record is made in the analog recorder 24.

The doppler navigation system 30 is conventional in nature and generates a frequency which is an indication of forward velocity of the aircraft. Each cycle of the frequency corresponds to a constant length on the ground and, therefore, a given count of cycles can be set to conform to a given distance on the ground. To accomplish this, a conventional digital frequency counter 32 is coupled to the doppler navigation system 30 to receive a signal having the fundamental frequency and by setting this counter, it will generate an output signal at intervals which correspond to predetermined ground distances.

In one embodiment of the present invention, it has been found desirable to make the basic ground units 1/40 of a nautical mile, or 152 feet. From this embodiment the digital counter is set to generate a signal at time intervals corresponding to each 152-foot interval. This signal is used to trigger the data acquisition phase of the digital recorder system 26 so that all of the pertinent information sensed by the detector system 20 can be written into the digital system at each interval. In addition, this signal actuates a fiducial marking pen on the analog recorder 24.

Simultaneously with the detection of the geophysical variables, the infrared scanner 18 is developing a photograph-like representation of the ground traversed by the aircraft. The infrared scanner is conventional in design except that it includes a conventional blanking circuit 34 which functions to blank out one scan of the writing system of the scanner to marking the photograph-like record with a reference mark and a serial number system 36. The serial number system 36 functions to establish correlation between the photograph-like record of the ground traversed by the aircraft and the record of the geophysical variables sensed by the detection system. The serial number system 36 is conventional in nature, comprising lenses, mirrors, and lights, and may be similar to that described in U.S. Pat. 2,598,697.

The triggering of the blanking circuit 34 is accomplished by coupling it to the output of the digital frequency counter 32. Thus, at the same instance that the basic mark is made in the analog recorder and the data acquisition train of the digital recorder is activated, a reference mark is placed upon the photograph-like representation developed by the infrared scanner 18.

To compensate for the change in velocity of the aircraft so that a constant scale can be maintained in the photograph-like record as well as the analog record, a signal employing the fundamental frequency generated by the doppler navigation system is used to drive the motor advancing the film of the infrared scanner.

The system above described develops a photograph-like representation of the ground traversed by the aircraft and simultaneously a recording of the geophysical variables sensed by the detector system as they pass over the ground. Each of these records is marked with a fiducial mark which establishes constant ground distances. However, it is necessary to mark the records with additional references so that they may be correlated. In the present embodiment, this one-to-one correlation of the various records is achieved in part by the serial number system 36. In this system the blanking circuit signal advances a mechanical serial counter of conventional design by one unit, and flashes a light upon it so that its image, formed by a series of lenses and mirrors, is projected upon the film which records the infrared density pattern. At the same time, the actuating pulse for the digital data acquisition system causes an advance of one unit in an identifying digital number sequence. The correspondence of the two numbers establishes the correspondence of the geophysical data observation with a point on the ground.

In addition, at substantially the same instant the analog record is marked occasionally by hand notation so that the sequence of fiducial marks is numerically in order and in one-to-one correspondence with the ground image point and the digital data group.

What is claimed is:

1. A method of conducting a geophysical survey during periods of low light intensity from an aircraft having a doppler navigation system comprising the steps of:

conveying over the ground one or more detecting devices for detecting geophysical variables and obtaining therefrom electrical signals representative of the detected variables;

utilizing said electrical signals to develop with a recording system a record of said variables;

conveying over the ground simultaneously with said detecting devices an infrared monitor capable of detecting electromagnetic radiation having frequencies in the infrared portion of the spectrum and generating an electrical signal representative of the detected infrared radiation;

utilizing said electrical signal to develop a photograph-like record of the ground traversed by said aircraft;

controlling the development of the photograph-like record and the record of said geophysical variables as a function of the fundamental frequency generated by said doppler navigation system; and simultaneously introducing a fiducial system into the record of said geophysical variables and said photograph-like record of the ground to permit correlation of the record of said geophysical variables with specific ground locations.

2. The method of claim 1 including the additional step of monitoring the frequency of the primary signal of said doppler navigation system to generate a signal at predetermined time intervals; and supplying said signal simultaneously to said infrared monitor and to said recording system to establish a reference mark on said photograph-like representation and said record of the geophysical variables to establish intervals representing equal ground distances.

3. The method of claim 2 wherein the recording system includes a digital recorder, the additional step of supplying said signal to said digital recorder, to initiate the recording of information at each of said predetermined time intervals.

4. The method of claim 1 wherein the geophysical survey is a gradiometer survey and the detecting devices are a pair of magnetometers conveyed at different altitudes, each measuring the earth's magnetic field, and the recording system develops a record representative of the differential of the magnetic field measured by each magnetometer.

References Cited

UNITED STATES PATENTS

| | | | |
|---|---|---|---|
| 2,610,226 | 9/1952 | Klasse et al. | 324—4 XR |
| 2,611,802 | 9/1952 | Jensen | 324—4 XR |
| 2,779,914 | 1/1957 | Rumbaugh et al. | 324—4 |
| 3,023,359 | 2/1962 | Jenny et al. | 324—4 |
| 3,076,189 | 1/1963 | Goddard. | |
| 3,076,961 | 2/1963 | Bibbero | 250—83.3 XR |
| 3,261,014 | 7/1966 | Diaz. | |

GERARD R. STRECKER, Primary Examiner

U.S. Cl. X.R.

250—83.3